United States Patent
Hertz et al.

[11] Patent Number: 6,029,966
[45] Date of Patent: Feb. 29, 2000

[54] FLEXIBLE, SELF CONFORMING, WORKPIECE SUPPORT SYSTEM

[76] Inventors: Allen D. Hertz, 12784 Tulipwood Cir., Boca Raton, Fla. 33428; Anthony A. Imm, 485 Lakeside Cir., Sunrise, Fla. 33326; J. Stephen Wiggs, 6141 NW. 60th Ave., Parkland, Fla. 33067

[21] Appl. No.: 09/170,016

[22] Filed: Oct. 13, 1998

[51] Int. Cl.⁷ ........................................ B25B 1/24
[52] U.S. Cl. ...................... 269/266; 269/53; 269/54.4; 269/289 R
[58] Field of Search ................ 269/266, 53, 54.4, 269/54.5, 289 R, 254 R

[56] References Cited

U.S. PATENT DOCUMENTS

| | | | |
|---|---|---|---|
| 4,936,560 | 6/1990 | Barozzi | 269/266 |
| 5,152,707 | 10/1992 | Dougherty et al. | 269/266 |
| 5,157,438 | 10/1992 | Beale | |
| 5,794,329 | 8/1998 | Rossemeisl | |

*Primary Examiner*—Timothy V. Eley
*Assistant Examiner*—Benjamin Halpern

[57] ABSTRACT

A method and apparatus are disclosed for a flexible support system using elongated support members to support a face of a workpiece. The flexible support members are arranged through at least one plane of perforated material, where the elongated support members are raised to the maximum designed position, the shafts of the elongated support members are subjected to a resistive force, the position of the elongated support members are adjusted by the contacting forces applied by bringing the workpiece and the flexible support assembly together, then applying a locking force to secure the elongated support members where the elongated support members can sustain the loads applied during the operation onto the workpiece. Additionally, methods are disclosed which allow the elongated support members to optionally drop upon reaching a designed position.

7 Claims, 8 Drawing Sheets

FLEXIBLE, SELF CONFORMING, WORKPIECE SUPPORT SYSTEM

FIELD OF THE INVENTION

The present invention relates to flexible support systems using elongated support members that vary in position to support planer and/or three dimensional workpieces.

BACKGROUND OF THE INVENTION

Numerous manufacturing processes require a means to support a workpiece, without causing damage, so that an operation can be effected thereon, particularly an operation which applies a force or pressure to the workpiece, such as a printed circuit board (PCB) during printing or population. The face of the workpiece to be supported may not necessarily be planer, as demonstrated by the example of a two-sided electronics assembly; at least one application requires tooling to support a three dimensional face.

One known method used for supporting a workpiece is to machine custom support plates designed for each specific application. This method is costly and requires the inclusion of a process step to change the tooling on the assembly line coinciding with each change in production build. This additional process step to change the tooling complicates or virtually eliminates the "one-up" factory.

A second known method used for supporting a workpiece is to place fixed height support members at locations which coincide with locations on the workpiece that are at the same plane, i.e. for a Printed Circuit Board (PCB), one would locate the support members where they are clear of any components and contact the PCB. This process is difficult to repeat, and costly to automate (U.S. Pat. No. 5,794,329, Rossmeisl, et al). The layout of the PCB must be such that there are unpopulated areas large enough to accommodate the surface area required for the cross section of the support members. The equipment must also be programmed which is time consuming and may include errors. The system operates in series which has a high cycle time compared to a system which works in parallel.

A third known method described by Beale, U.S. Pat. No. 5,157,438, teaches a workpiece support and clamping means which uses individual armatures and electromagneto magnets to selectively clamp the elongated members in a raised position or allow them to fall to a lowered position. The elongated support members are either fully extended or fully retracted. This method requires complex designs and systems to support it. If the elongated support members do not align with areas on the said workpiece that are planer with the workpiece, the elongated support members will fall to the lowered position, thus not adequately supporting the assembly.

What is desired is a system which is flexible, can automatically create a profile to support the face of any workpiece, including a non-planer surface, and minimizes any forces transferred to the said face. The system should be designed to be repeatable, serviceable, and with minimal complexity.

SUMMARY OF THE INVENTION

One aspect of the present invention is to provide a means to support one face of a workpiece to support the workpiece during an operation in which a force is applied to primarily opposing face of the workpiece.

A second aspect of the present invention is to provide a means to support the workpiece using at least one elongated support member preferably multiples located in an array.

A third aspect of the present invention is to provide a, preferably automated, means to reset the elongated support members to the predetermined, "maximum" distance from the primary assembly position, where the elongated support members are temporarily held in position by a resistive force. The elongated support members are adjusted to the desired height by bringing the workpiece and the primary assembly together, where the surface of the workpiece adjusts the elongated support members against a resistive force to the desired heights.

A forth aspect of the present invention is to provide a clamping force to lock the elongated support members after the elongated support members are located to the desired height.

A fifth, optional, aspect of the present invention is the ability to easily remove or install any of the said support members from the primary assembly of the invention.

A sixth, optional, aspect of the present invention is a method to vary the size of the array of elongated support members to match the variety of subject workpieces.

A seventh, optional, aspect of the present invention is a method to control the height of the support elongated support members to either in the maximum distance from the primary assembly or minimum distance from the primary assembly.

The invention, an apparatus which consists of:

A layer of plates which includes at least one, but preferably an array, of perforations, where each perforation is slightly larger than the cross section of the respective elongated support member(s). The preferred embodiment would be three layers, where the top and bottom perforated layers are used to align the elongated support members preferably perpendicular to the plates and the perforated middle, or locking layer which slides along the plane of the plates to lock the elongated support members in the desired position.

An array of elongated support members placed through the array of perforations located in each of the layers of plates. The elongated support members slide along their axis to create the three dimensional support structure. The elongated support members can optionally have an enlarged end at the end which contacts the workpiece to spread the load across an area of the said workpiece. The elongated support members can optionally have a mechanism, such as a securing member, that that allows the elongated support member to be assembled into the primary assembly, while allowing the elongated support member to removed as required. This can be accomplished by a variety of methods, including but not limited to a fastening clip or a rotating securing device.

An elongated support member lifting system which resets the elongated support members to the designed maximum height. The preferred embodiment is a flat plate located on the underside of the layer of perforated plates. The primary assembly would move towards the plate (or vice versa) to reset the elongated support members to the designed maximum height.

A resistance system which applies a small frictional force, to overcome gravity, to the elongated support members temporarily holding them at the designed maximum height position after the elongated support members are reset. The resistance system temporarily holds the elongated support members, but allows them to move axially when a force is applied onto the ends of the elongated support members, without the elongated support members applying a restoring force onto the workpiece. The amount of force to move the elongated support members can be controlled by the coefficient of friction between the resistive member and the elongated support member. Two examples of this system would be placing the elongated support members through foam or against a magnet.

The elongated support members can optionally be designed to work in conjunction with the resistance system where the resistance system is only engaged over a small section of the shaft of the elongated support member. The elongated support members could be manufactured with a wider section of the shaft where the resistive force is only applied while in contact with the wider section of the shaft of the elongated support member when using foam, rubber or similar, or manufactured with a magnetic section within the non-magnetic shaft where the resistive force is only applied while in contact with the magnetic section of the shaft of the elongated support member when using a magnetic resistance system. It is recognized that other such systems may be used for similar purposes.

DETAILED DESCRIPTION OF THE INVENTION

Figure 1:
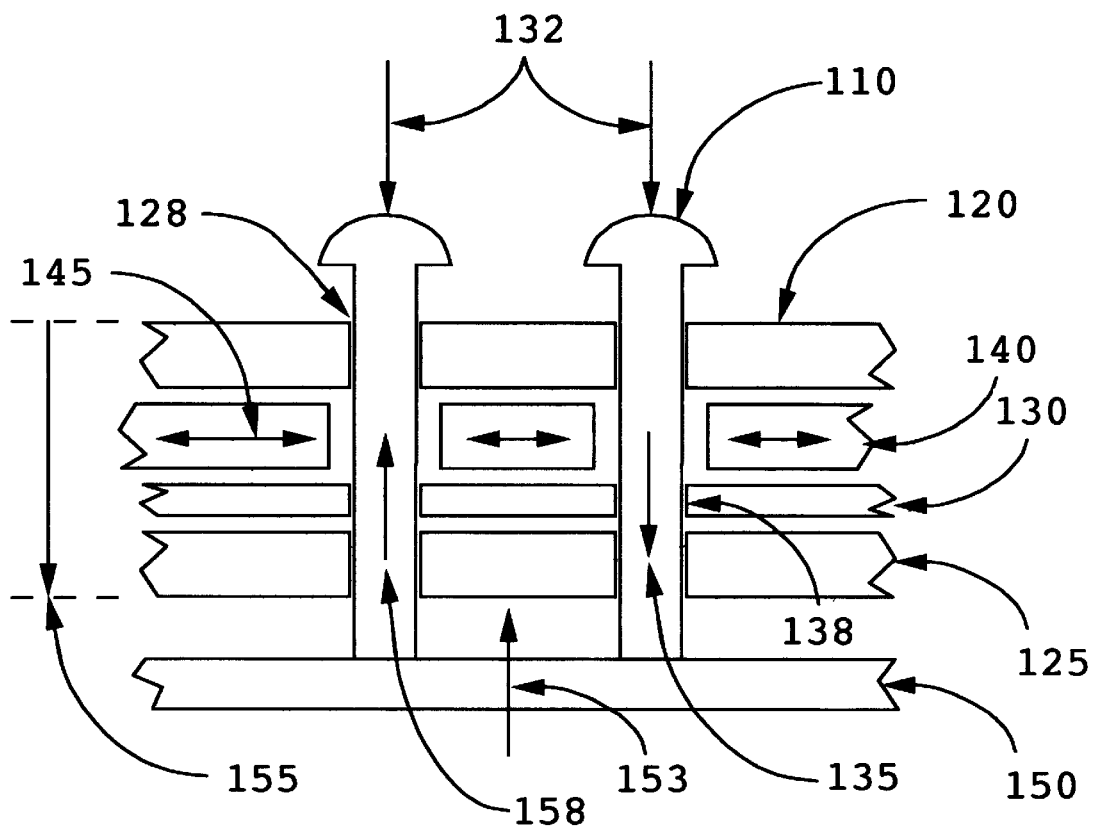
FIG. 1 is a cross sectional drawing illustrating the general components of the invention, including the associated movements for operation.

FIG. 1 is a cross sectional drawing of the general invention 100 illustrating the elongated support members 110, which are preferably arranged in an array (not shown). The elongated support members 110 are held primary parallel by at least one perforated planer member, where the preferred embodiment would be two perforated planer members 120 and 125, which have similar patterns of perforations 128 designed to allow the elongated support members 110 to adjust perpendicularly 135 to the plane of the at least one perforated planer member 120 and/or 125. The elongated support members 110 are temporarily held in position by the frictional forces enduced by a resistance member 130. The resistance member 130 consists of any material which would create a retaining force (not shown) at the point of contact 138, where when a force 132 is applied to the elongated support members 110 to cause the elongated support members 110 to move 135, but the retaining member 130 will not create a force which will cause the elongated support members 110 to return to their original position. Examples of this material are: foam, rubber, woven mesh, or magnets. This system can be designed to control the force 132 required to move each elongated support member 110. The elongated support members 110 are locked into position after being adjusted to the desired height by shifting 145 a locking plate 140 to create a wedge between the openings of the perforated upper planer member 120, the locking plate(s) 140 and/or the perforated lower planer member 125. The elongated support members 110 are reset to the designed maximum vertical position by moving 145 the locking plate 140 to the unlocked position (shown), then moving the primary assembly (consisting of the elongated support members 110, the perforated upper planer member 120, the perforated lower planer member 125, the resistance member 130 and the locking plate 140) downward 155 onto a reset plate 150, or moving the reset plate upwards 153 towards the upper assembly or combined movement of both. The reset plate 150 will move the elongated support members 110 upwards 158 against the resistance force (not shown) from the resistance member 140.

Figure 2:
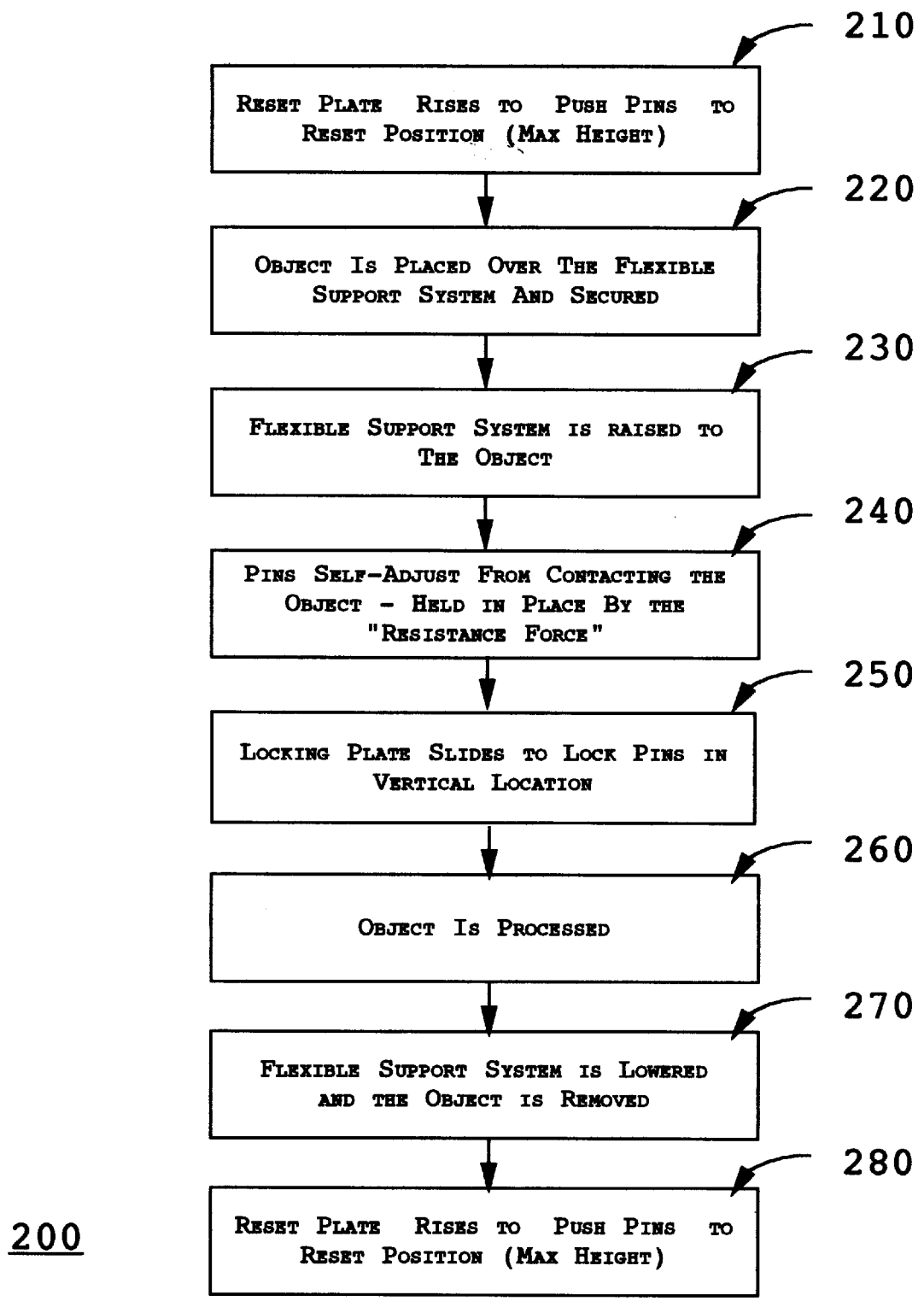
FIG. 2 is an operational flow diagram demonstrating the various steps of the application of the invention.

FIG. 2 is an operational flow diagram 200 describing the general operational flow of the flexible support apparatus. The first step 210 is to reset the assembly 100 where the elongated supporting members 110 are placed in the farthest upward position. This can be accomplished by moving the reset plate 150 towards 153 the primary assembly or moving the primary assembly towards 155 the reset plate 150, or both. The second step 220 in the operational flow diagram 200 is to locate the workpiece over the flexible support system 100 and secure the workpiece. The third step 230 in the operational flow 200 is secure the workpiece and to bring the flexible support system and the workpiece together. The preferred method would be to raise the flexible support system 100 to the stationary, secured workpiece. The forth step 240 in the operational flow 200 is the self-adjustment of the elongated supporting members (pins) 110. The elongated support members 110 are lowered 135 against the force created upon contacting points of the workpiece. Optionally, the system 100 may be designed such that when the elongated supporting members 110 travel beyond a desired distance, the elongated supporting members 110 no longer have the resistance force (not shown) exerted from the resistance member 130 and will automatically drop to the lowest distance. The elongated support members 110 are temporarily held in place by a resistance force (not shown) created by the resistance member 130. The elongated support members 110 are held parallel to the motion by the design of the perforated upper support plate 120 and, if required, based upon thickness of the plates, perforated lower support plate 125. The fifth step 250 of the operational flow 200 occurs after the primary assembly is brought to its final position in reference to the workpiece. The locking plate 140 slides to lock the elongated support members 110 in the desired location. The sixth step 260 of the operational flow 200 is to complete the operation on the workpiece. The seventh step 270 of the operational flow 200 is to separate (in the case of the preferred embodiment, lower) the primary assembly from the workpiece and remove the workpiece. The eighth step 280 of the operational flow 200 is reset the flexible support apparatus where the elongated support members 110 are placed in the maximum height position.

Figure 3:
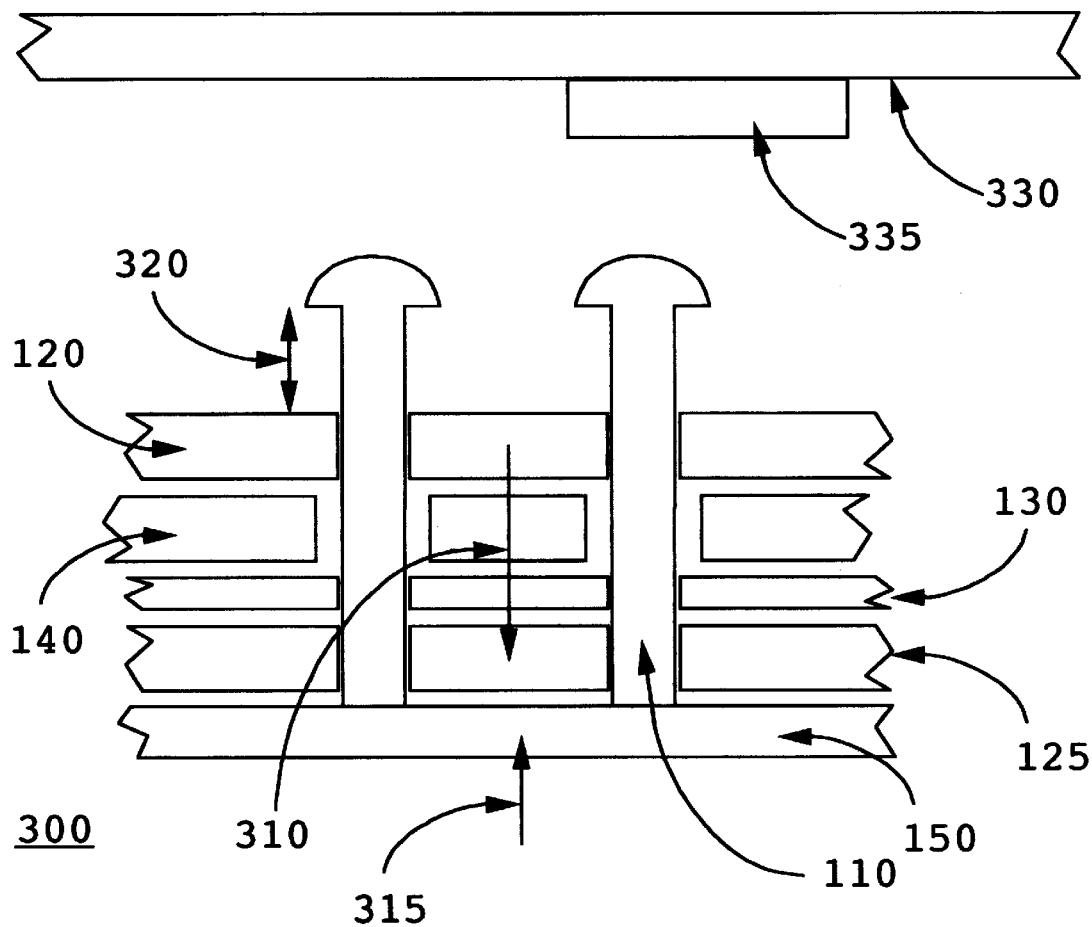
FIG. 3 is a cross sectional drawing which illustrates the invention in the reset state.

FIG. 3 illustrates the flexible support apparatus 100 in the reset position 300. The elongated support members 110 are reset to the designed maximum height 320 by: either the primary assembly lowers 310 towards the reset plate 150 or the reset plate 150 is raised 315 towards the primary assembly, or combination thereof. The workpiece to be supported 330 is shown above the flexible support apparatus in the reset position 300. A protrusion (shown as a component) 335 is shown attached to the workpiece to be supported 330 to demonstrate the mechanisms which configure the flexible support apparatus.

Figure 4:
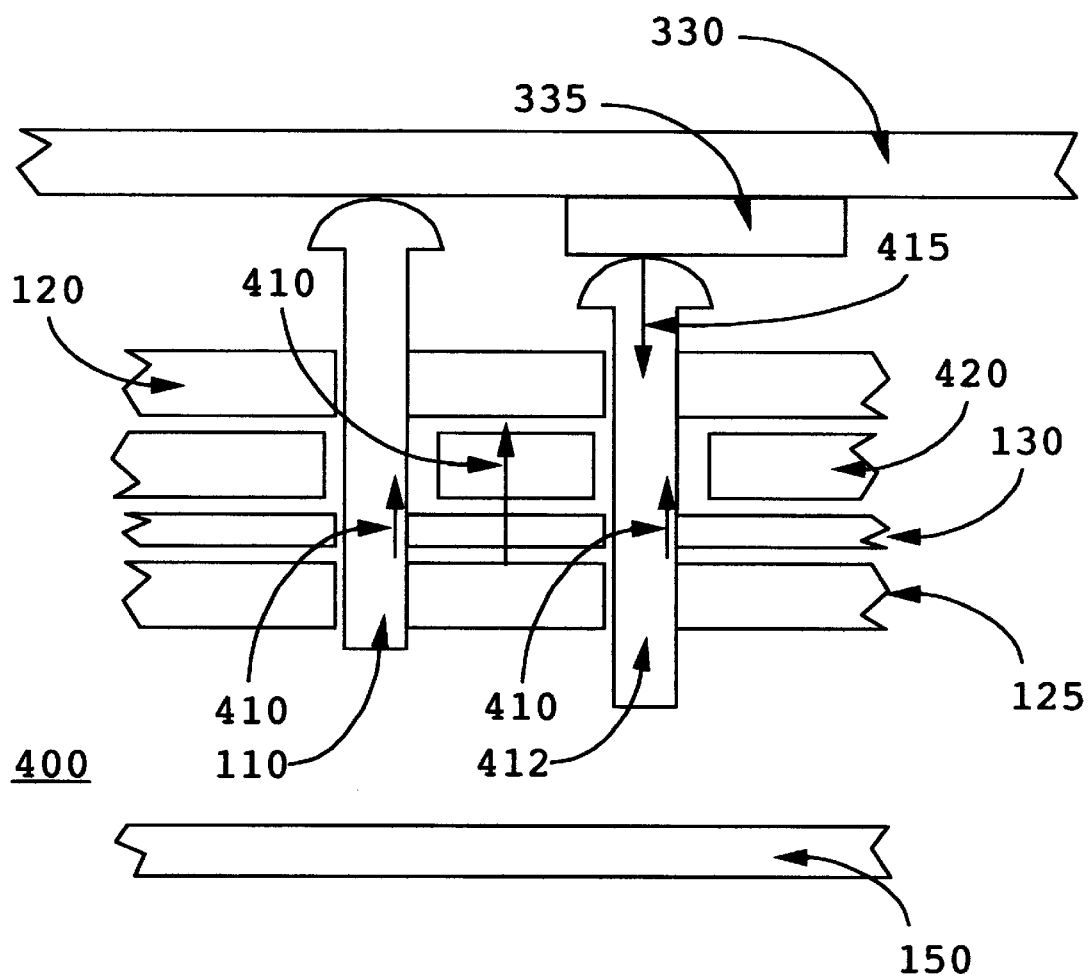
FIG. 4 is a cross sectional drawing which illustrates the invention in the adjusting state. The drawing includes the forces imposed, resulting from the motion of the apparatus.

FIG. 4 illustrates the flexible support apparatus in the adjusting position 400. The primary assembly is either raised 410 to the workpiece 330, or the workpiece 330 is lowered (not shown) to the primary assembly. During this motion, the elongated support members 110 are temporarily held in position by a resistive force 410 cause by friction between the elongated support member 110 and the resistive plane 130; the locking plate 420 is in the unlocked position; and the elongated support members are held preferably perpendicular to the plane by the perforated upper plate 120 and/or the perforated lower plate 125. Upon contact between the elongated support members 110, 412 and the workpiece 330 or the features which extend beyond the primary plane of the workpiece (protrusions/components/etc.) 335, respectively, the workpieces 330 or features 335 exert a force 415 onto the elongated supporting members 110, 412; the force 415 overcomes the resistive force 410 and causes the associated elongated supporting members 412 to move down, as shown by comparing the not moved position of the elongated support member 110 to the moved position of the elongated support member 412.

Figure 5:
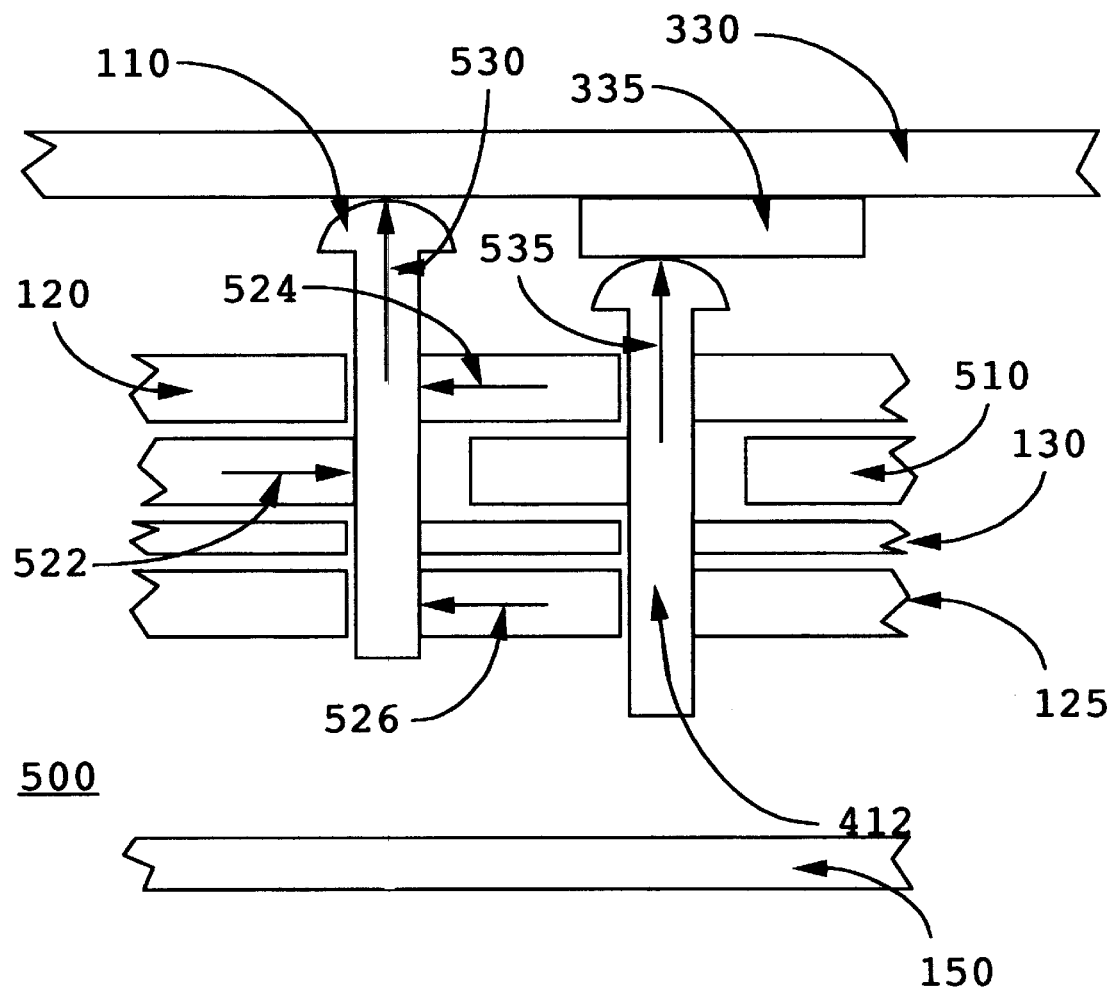
FIG. 5 is a cross sectional drawing which illustrates the invention in the secured state.

FIG. 5 illustrates the flexible support apparatus in the locked state 500. The figure illustrates the elongated support members 110, 412 located against the workpiece 330 and the protruding member 335 respectively. The elongated support members 110, 412 are temporarily held in location by the resistance member 130. The locking member illustrated in the locking position 510, exerts a force 522, pushing the elongated support members 110, 412 against the perforated upper plate 120 and/or perforated lower plate 125. The perforated upper plate and/or perforated lower plate exerts an opposing force 524, 526 respectively. The various opposing forces 522, 524, and 526 secure the elongated support members 110, 412 in position to create a supporting force 530 onto the workpiece 330 and a supporting force 535 onto the attachment to the workpiece 335.

Figure 6:
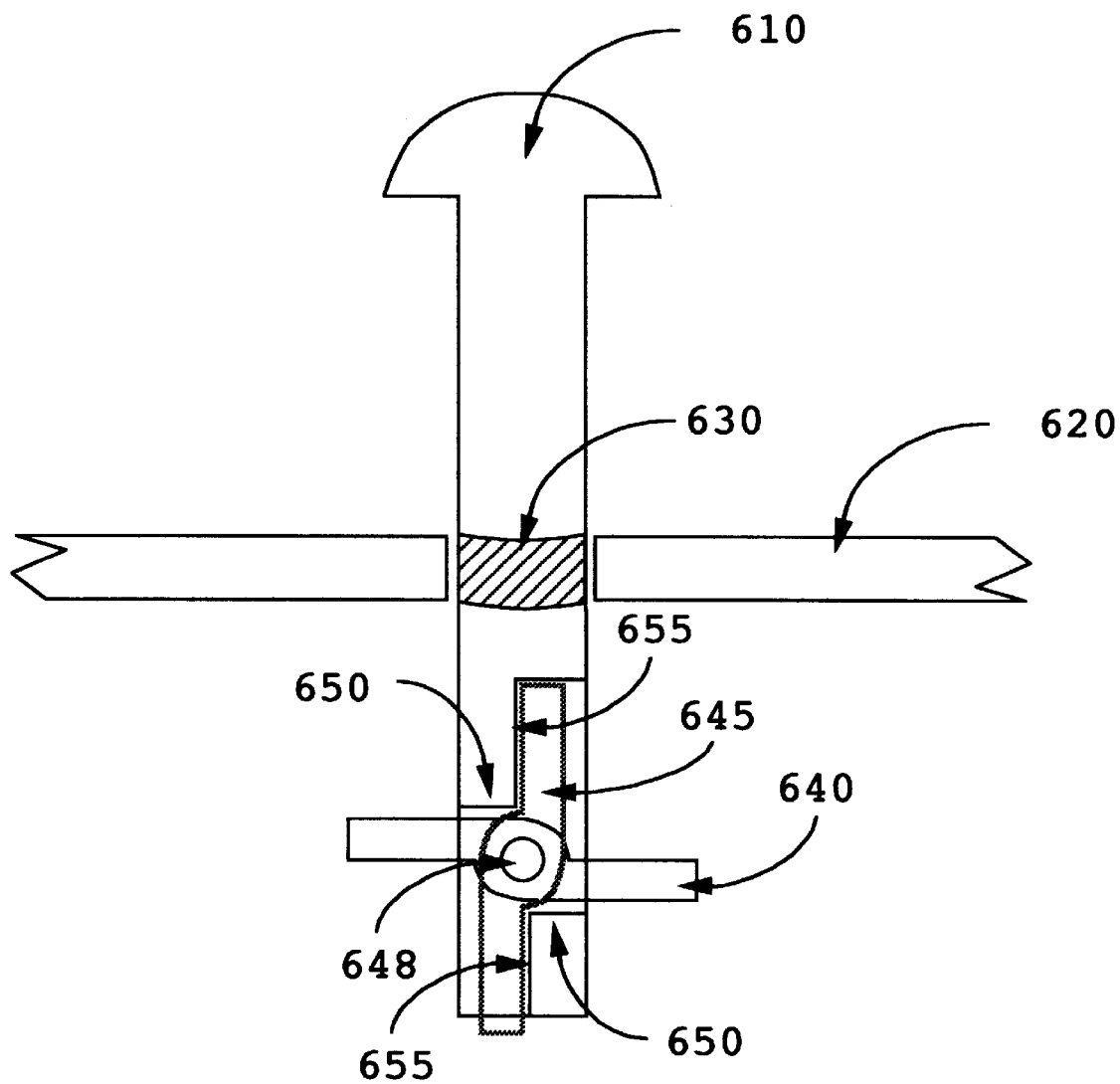
FIG. 6 is a cross sectional drawing which illustrates one elongated support member used in conjunction with a magnetic resistance system, where the elongated support member is designed to drop after the elongated support member travels beyond a specified distance. The cross sectional drawing includes one of the optional designs of a retaining mechanism.

FIG. 6 illustrates a first set of examples of two (2) proposed optional features on an elongated support member 610. The first optional feature illustrated is an automated dropping feature 630, where in the example shown is a magnetic band 630 for use in conjunction with a magnetic resistance plate 620. The elongated support member 610 would be manufactured of a non-magnetic material, and the automated dropping feature 630 would be of a magnetic material. The automated dropping feature 630 may be of a bent foil, plated material, molded insert, or other method of application. The second optional feature is an elongated support member securing mechanism, shown in the securing position 640 or in the release position 645, able to rotate about an axis 648. The securing mechanism is used to secure the elongated support members 610 in the primary assembly during handling where the securing mechanism 640 rests against the perpendicular stop 650, while allowing the elongated support member 610 to be easily removed from the primary assembly as desired by rotating the securing mechanism about the axis 648 where the securing mechanism 645 is placed against the parallel stop 655.

Figure 7:
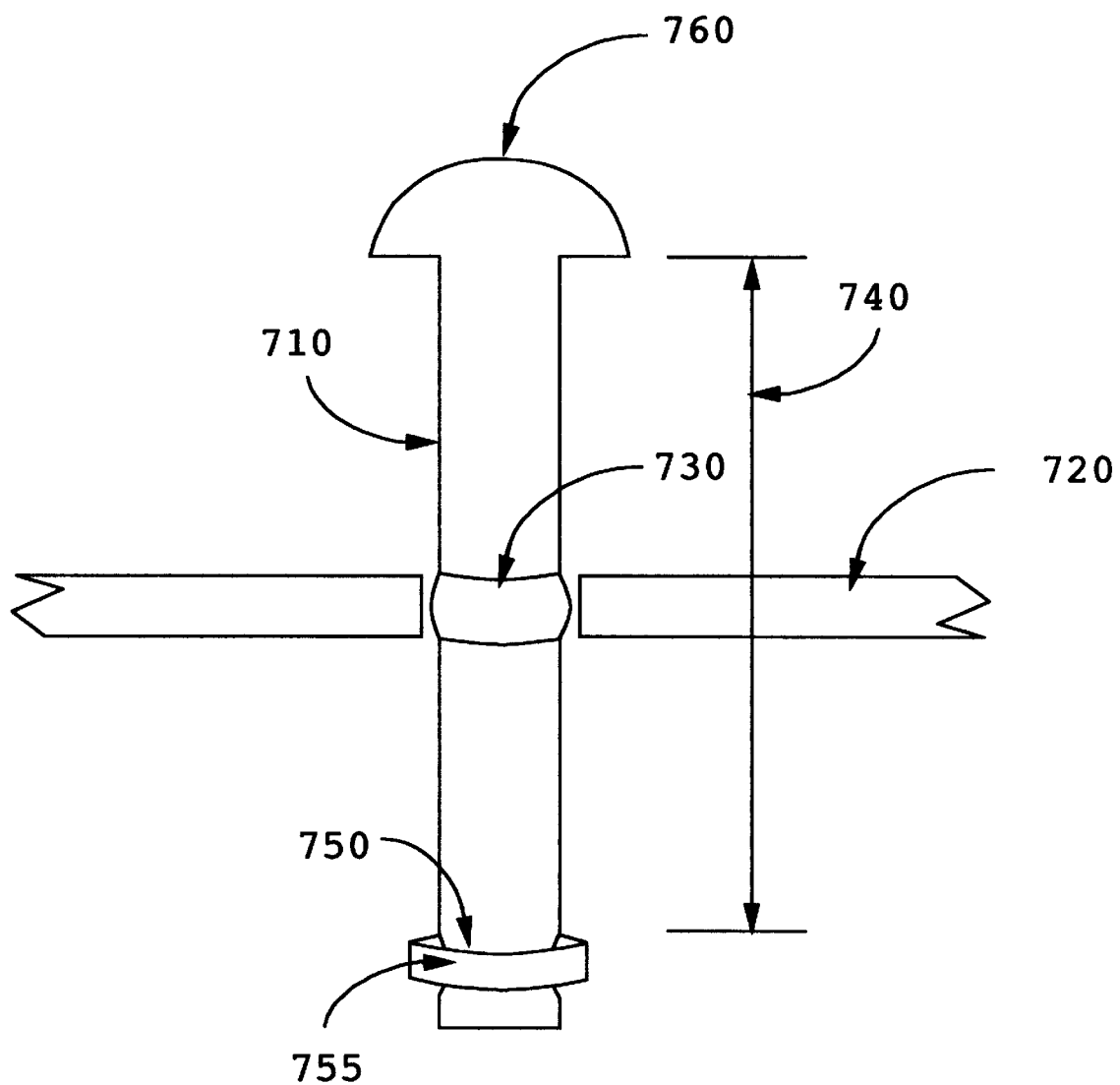
FIG. 7 is a cross sectional drawing which illustrates the elongated support member used in conjunction with a mechanical resistance system, where the elongated support member is designed to drop after the elongated support member travels beyond a specified distance. The cross sectional drawing includes a second of the optional designs of a retaining clip.

FIG. 7 illustrates a second set of examples of two (2) proposed optional features on an elongated support member 710. The first optional feature illustrated is an automated dropping feature 730, where in the example shown is a increase in width 730 of the elongated support member 710 for use in conjunction with a mechanical resistance plate 720. The automated dropping feature may be included in the shape of the elongated support member 710 or added coupling a second piece 730 to the elongated support member 710. The second optional feature is an elongated support member securing mechanism 755, where the securing mechanism 755 is a clip located in a slot included in the shape of the elongated support member 710. The securing mechanism 755 is used to secure the elongated support members 710 in the primary assembly during handling where the securing mechanism 755 is coupled to the elongated support member 710, while allowing the elongated support members 710 to be easily removed from the primary assembly as desired by removing the securing mechanism 755 from the elongated support member 710.

It is recognized that FIGS. 6 and 7 illustrate two examples of many possible concepts to accomplish the same features.

Figure 8:
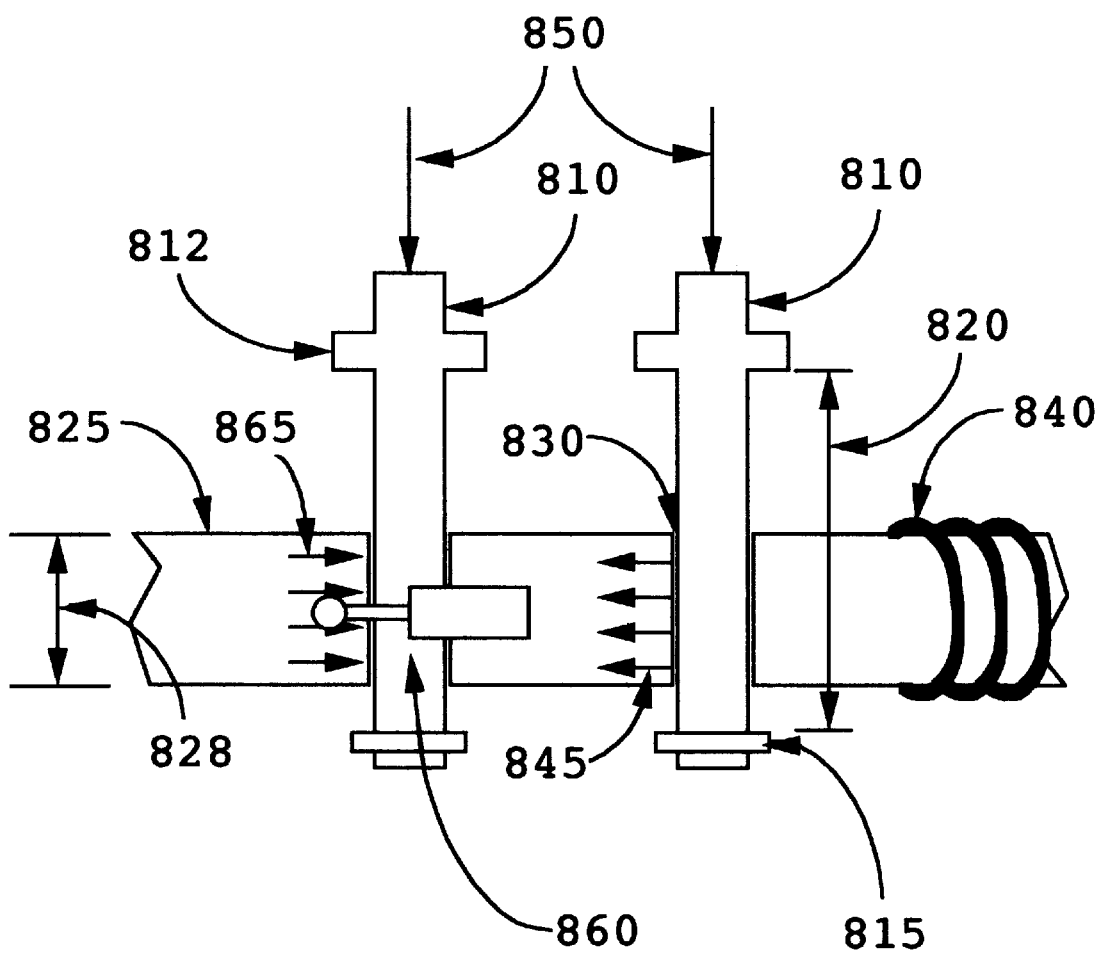
FIG. 8 is a cross sectional drawing which illustrates two alternative methods to apply resistive and securing forces; the first being using electromagnets, the second using mechanics.

FIG. 8 illustrates two optional methods demonstrating alternative means to apply resistive and securing forces. The first method utilizes an elongated support member 810, with a shaft 820 which at least partially consists of a magnetic material. The elongated support members 810 are located in at least one, but preferably an array of, perforation(s) 830 within the primary member 825. The primary member 825 is designed where the thickness 828 is sufficient to maintain approximate parallelism between each of the said elongated support members 810. The elongated support members 810 may optionally be contained within the perforations by a collar 812 and a locking mechanism 815. A coil 840 is located in a manner to induce a variable magnetic force 845 onto the primary member 825. When a current (not shown) is placed through the coil 840, the coil 840 induces a magnetic force 845, where the magnetic force 845 creates a frictional force between the shaft 820 of the elongated members 810 and the perforation 830 to temporarily secure the elongated support members 810, allowing them to be adjusted by a small force 850. When the current (not shown) is increased, the coil 840 induces a greater magnetic force 845 to secure the elongated support members 810, such that the elongated support members 810 do not move when a load 850 is applied. The second method utilizes mechanical means 860 in conjunction with the primary member 825. When a small force is applied to the mechanism 860, the mechanism 860 brings the two sections of the primary member 825 together applying a resistive force 865 to the shaft 820 of the elongated support member 810, where the resistive force allows the elongated support members 810 to be adjusted to the desired position. After adjustment, the force applied to the mechanism 860 is increased to secure the elongated support members 810, such that the elongated support members 810 do not move when a load 850 is applied.

What is claimed is:

1. A flexible, self conforming support apparatus to support a face of a workpiece during an operation which a force is applied to a primarily opposing face of said workpiece, the flexible support apparatus comprising of:

a plurality of elongated members each extending through a plurality of perforated members;

a respective end surface on each of the said elongated support members, where one end contacts the said workpiece, and the elongate support members adjust along a shaft of the elongated support member approximately according to a profile of the contact face of the said workpiece;

a resistive member which applies a resistive force to the shaft of each elongated support member to act as a temporary restraint while adjusting the position of the elongated support members, using contacting forces between the workpiece and the end of the elongated support member; and a locking member which moves substantially perpendicular to the adjusting motion of the elongated support members to couple the elongated support members between the perforated plate and the locking member, where the coupling provides a locking force designed to maintain the position of the elongated support members such to provide the supporting forces to the workpiece during an operation on the opposing face.

2. A flexible, self conforming workpiece support apparatus as described in claim 1, wherein at least a portion of the shaft of the elongated support members is of a magnetic material;

wherein the resistive member is at least partially of a magnetic material; and wherein the magnetic material of the resistive member is magnetically coupled to the magnetic material of the shaft of the elongated support members to apply the resistive force to the elongated support members.

3. A flexible, self conforming workpiece apparatus as described in claim 1 where a portion of the locking member which contacts the shaft of the elongated support member is at least partially consisting of flexible material such as rubber, foam, or similar to compensate for tolerances.

4. A flexible, self conforming workpiece apparatus as described in claim 1, where the resistance member consists of a flexible material such as rubber, foam, or similar, capable of applying a resistive force independent of any external forces applied to the resistance member.

5. A flexible, self conforming workpiece apparatus to support a face of a workpiece during an operation which a force is applied to a primarily opposing face of the workpiece, said flexible support apparatus comprising of:

a plurality of elongated support members each extending through an at least one perforated plate;

a respective end surface on each of the elongated support members, where one end contacts the said workpiece;

a resistive member to act as a temporary restraint while adjusting the position of the elongated support members;

a means to reduce the resistive force between a shaft of the elongated support member and the resistive member when the elongated support member travels beyond a predetermined distance, allowing the elongated support member to drop, thus no longer contacting the workpiece;

an at least one locking floating within the primary assembly of the apparatus and designed to couple the elongated support member between the at least one perforated plate and the locking member; and where the coupling created by the locking member is greater than the force created by the resistive member, designed to maintain the position of the elongated support members such to provide the supporting forces to the workpiece during an operation of the opposing face.

6. A flexible, self conforming workpiece apparatus as described in claim 5 where the resistive member is of a flexible medium, where the resistive force is a resultant of the flexible medium returning to the original shape; and where at least one of the elongated support members is enlarged along a portion of the shaft of the elongated support member to provide a decrease in the resistive force once the elongated member is positioned where the enlarged section is not contacting the resistance member.

7. A flexible, self conforming workpiece apparatus as described in claim 5, where the shaft of at least one of the elongated support members is of a non-magnetic material; and where a portion of the shaft of the elongated support member is of a magnetic material to provide a decrease in the resistance force once the shaft of the elongated member is positioned where the section of magnetic material is no longer contacting the magnetic resistance member.

* * * * *